United States Patent [19]

Adamson et al.

[11] 4,341,277

[45] Jul. 27, 1982

[54] PERFORATED HOOD WITH AIR SCOOP

[75] Inventors: Joseph W. Adamson; Clifford W. Corr, both of Springfield, Ill.

[73] Assignee: Fiat-Allis Construction Machinery, Inc., Deerfield, Ill.

[21] Appl. No.: 161,675

[22] Filed: Jun. 23, 1980

[51] Int. Cl.³ .............................................. B60K 11/04
[52] U.S. Cl. .................................. 180/54 A; 180/69 R
[58] Field of Search .................. 180/69 R, 69 C, 54 A

[56] References Cited

U.S. PATENT DOCUMENTS

| 3,358,787 | 12/1967 | Bangasser et al. | 180/69 R |
| 3,866,580 | 2/1975 | Whitehurst et al. | 180/54 A |
| 3,923,114 | 12/1975 | Suzuki | 180/54 A |
| 4,086,976 | 5/1978 | Holm et al. | 180/54 A |

FOREIGN PATENT DOCUMENTS

| 1455741 | 5/1969 | Fed. Rep. of Germany | 180/69 R |
| 1034340 | 7/1953 | France | 180/54 A |

Primary Examiner—John A. Pekar
Attorney, Agent, or Firm—Anthony S. Zummer

[57] ABSTRACT

A perforated hood with air scoop establishing an ambient air flow to be directed to the coolant heat exchanger of a vehicle. The perforated hood with an air scoop includes a duct and baffle assembly which thermally isolates the ambient air from the heat of the engine to prevent a rise of temperature of the air flow for attaining greater cooling efficiency of the heat exchanger.

10 Claims, 5 Drawing Figures

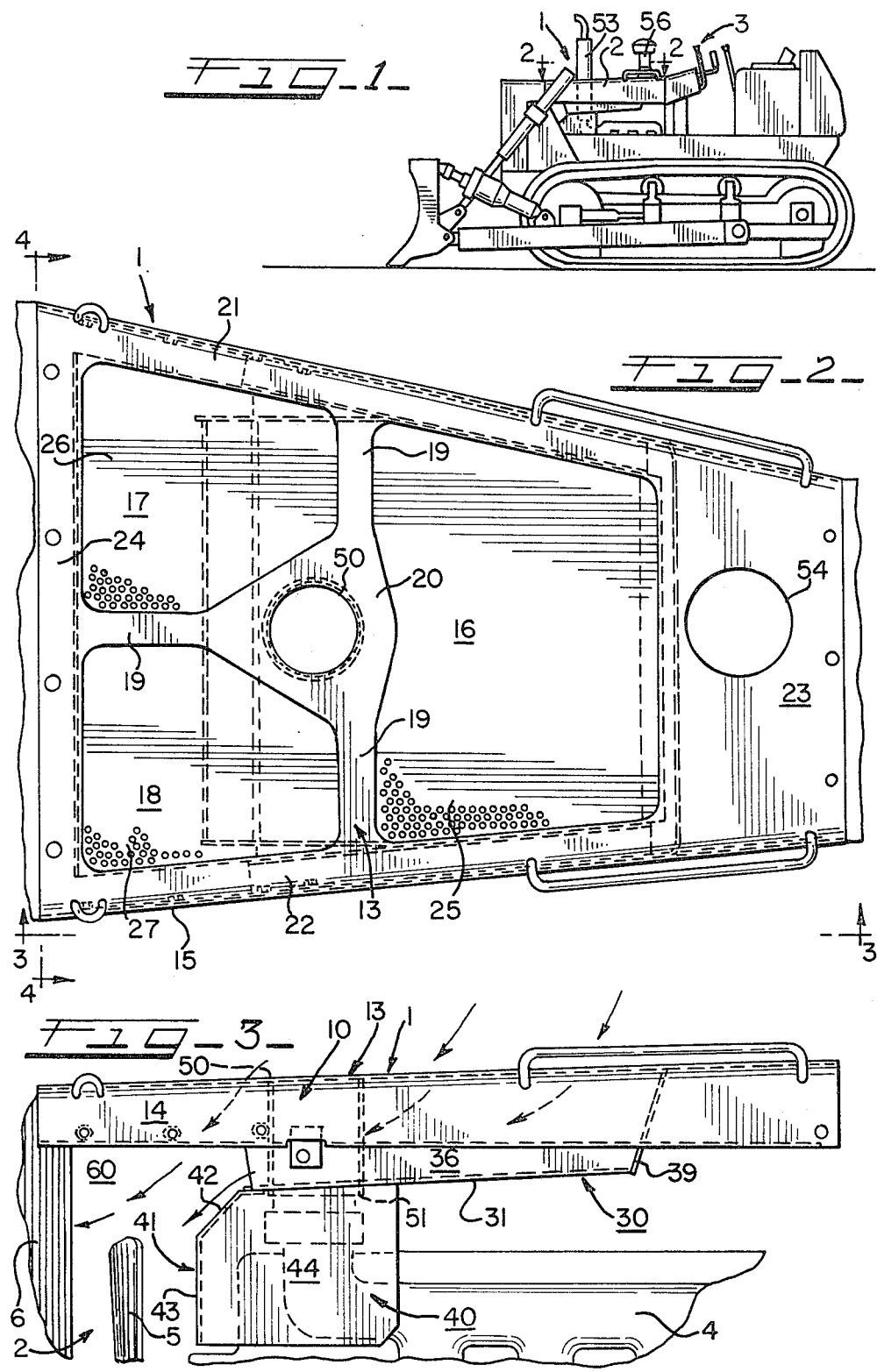

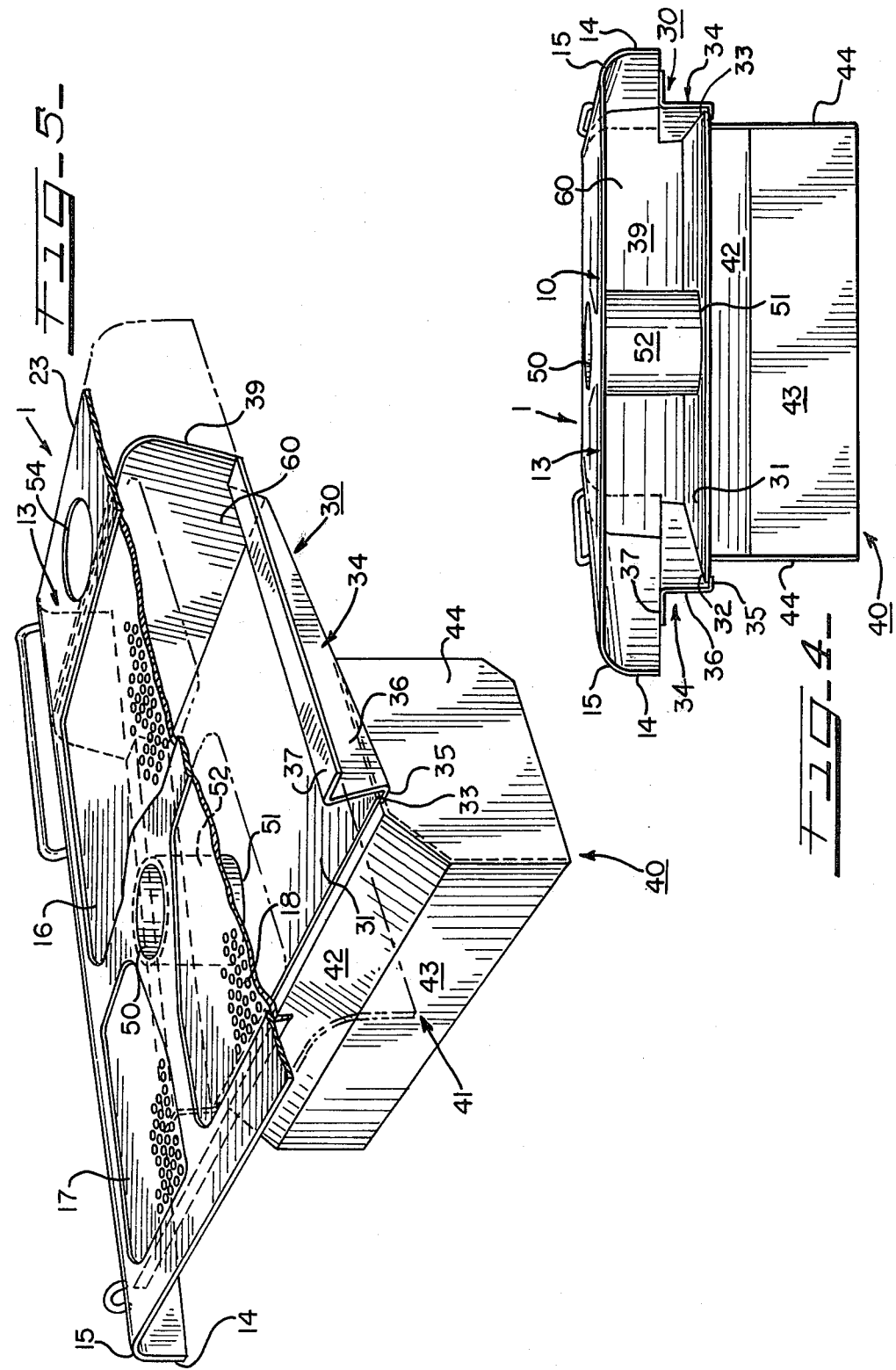

PERFORATED HOOD WITH AIR SCOOP

BACKGROUND OF THE INVENTION

This invention relates in general to vehicles and, in particular, to the hood for a vehicle engine enclosure.

More specifically, but without restriction to the particular use which is shown and described, this invention relates to a perforated hood with an air scoop for use in vehicles, such as, for example, construction machinery in the form of crawler tractors, scrapers, loaders and the like. The perforated hood with an air scoop of the invention directs ambient air to the vehicle radiator for effective cooling without establishing a heat exchange relationship with the engine.

In conventional cooling systems, such as employed in tractors and the like, external air is circulated through a hood or grill by a fan assembly for delivery to the engine coolant heat exchanger. The flow path established in such systems directs ambient air drawn into the engine compartment into direct thermal contact with the operating vehicle engine thereby elevating the temperature of the ambient air before delivery to the radiator.

The level of the temperature of the air passed through the vehicle tractor is a significant factor in establishing the cooling efficiency of the heat exchanger. The introduction of an air flow above ambient temperature causes a corresponding rise in temperature of the engine coolant in the top tank of the radiator. Such an elevation of the temperature of the coolant in the top tank occurs, because the efficiency of the radiator is dependent on several factors, some of which are the temperature difference between the air flow and coolant, the temperature drop of the coolant through the radiator, and the temperature rise of the air flow caused by thermal contact with the vehicle engine. Based on the foregoing relationship, the heat transferred by the engine to the air flow being directed to the radiator is a parameter, which directly affects the overall efficiency of the vehicle heat exchanger.

Prior art attempts to alleviate the problems associated with the heat rise of the radiator air flow caused by the vehicle engine have been unsatisfactory. Known systems have failed to provide suitable thermal isolation of the engine from the air drawn through the hood area to be effective in attaining increased radiator efficiency. Such techniques have also been deficient in delivering an optimum quantity of air to the heat exchanger for superior cooling. In addition, the employment of air delivery structures in the past to avoid the thermal effect of the engine have hindered servicability of the engine and have failed to incorporate desirable engine sound absorbing and debris protection capabilities.

Certain prior art designs, attempting to avoid the effects of engine temperature on cooling, require complete engine enclosures, which interfere with normal dissipation of the engine heat. Examples of prior art vehicle engine hoods and engine compartment designs are disclosed in U.S. Pat. No. 3,982,600 to Gerresheim, et al., issued Sept. 28, 1976, and U.S. Pat. No. 4,071,009 to Kraina issued Jan. 31, 1978, and U.S. Pat. No. 4,086,976 to Holm, et al., issued May 2, 1978.

SUMMARY OF THE INVENTION

It is, therefore, an object of this invention to increase the efficiency of the coolant heat exchanger associated with a vehicle engine.

Another object of this invention is to thermally isolate the air flow delivered to the heat exchanger of a vehicle from its engine.

A further object of this invention is to improve the hood of an engine compartment.

Still another object of this invention is to employ an air scoop to direct an ambient air flow to a vehicle radiator.

A still further object is to attain increased cooling efficiency in a vehicle radiator with optimum serviceability, sound absorption and debris protection for the engine.

These and other objects are attained in accordance with the present invention wherein there is provided an improved perforated hood with an air scoop to draw ambient air into the engine compartment for delivery to the coolant radiator, without passing into thermal contact with the engine. The perforated hood with the air scoop herein disclosed permits the radiator to achieve greater efficiency by preventing the elevation of the temperature of the ambient air flow due to the heat of the engine. The perforated hood of the invention permits a large volume of flow to be drawn by a pusher fan from the exterior into the air scoop for delivery to the radiator.

The flow path defined by the improved air scoop herein disclosed, through the engine compartment, is free of static pressure restrictions to permit optimum air flow to the heat exchanger. The perforated hood and air scoop of the invention also achieves increased radiator efficiency without interfering with engine serviceability, or vehicle exterior geometry or appearance. In addition, increased sound absorption and debris protection for the engine is provided by the invention. The increased efficiency of cooling provided by the invention further attains greater flexibility of design, since it permits the use of a radiator of smaller capacity, where desirable, to perform the same cooling as systems employing the prior art air circulating techniques.

BRIEF DESCRIPTION OF THE DRAWINGS

Further objects of the invention, together with additional features contributing thereto and advantages accruing therefrom, will be apparent from the following description of a preferred embodiment of the invention, which is shown in the accompanying drawings with like reference numerals indicating corresponding parts throughout, wherein:

FIG. 1 is a side schematic view of a construction vehicle employing the perforated hood and air scoop assembly of the invention.

FIG. 2 is a top schematic view of the perforated hood and air scoop assembly of the invention taken along line 2—2 of FIG. 1;

FIG. 3 is a partial side schematic view of the perforated hood and air scoop assembly of the invention taken along line 3—3 of FIG. 2 and illustrating a portion of the vehicle engine compartment;

FIG. 4 is an end schematic view of the perforated hood and air scoop assembly of the invention taken along line 4—4 of FIG. 2; and FIG. 5 is a perspective view of the perforated hood and air scoop assembly of FIG. 2.

DESCRIPTION OF A PREFERRED EMBODIMENT

Referring now to FIGS. 1 to 5, there is illustrated a perforated hood with air scoop assembly of the invention, generally designated by reference numeral 1. The air and hood scoop assembly 1 may be attached in operative position forming the upper portion of an engine compartment 2 of a vehicle 3, such as, for example, a crawler tractor as illustrated in FIG. 1, or alternatively, a scraper, wheel loader, and the like (not shown). The vehicle engine compartment 2 encloses the engine 4 and associated components, and a pusher fan assembly 5 is suitably mounted on the engine 4, as shown in FIG. 3.

The fan assembly 5 functions to draw a flow of ambient air into the engine compartment for delivery through a heat exchanger 6, such as a radiator as also shown in FIG. 3. The radiator 6 receives the engine water or other coolant to reduce its temperature and circulates the coolant back to the engine 4 in a conventional manner. The hood and air scoop assembly 1 includes a hood assembly 10 forming the upper portion of the engine compartment 2. The hood member 10 is attached in position to the vehicle in a conventional manner, and other panels and structural components, forming the engine compartment 2, may be operatively coupled to the hood assembly 10.

The hood assembly 10 comprises a flat upper hood member 3 having a pair of integral, downwardly extending hood side walls 14. The hood side walls 14 extend downwardly from a curved section 15 formed on the lateral edge of the hood member 13. A plurality of openings, creating ambient air inlets 16, 17, and 18, shown in FIGS. 2 and 5, are disposed in the hood member 13 and are separated by three angularly disposed, imperforate segments 19, which terminate with a central connecting portion 20. The inlets 16, 17, and 18 in the hood member 13 are laterally bounded by structural border portions 21 and 22. The hood member 13 is further provided with a rear laterally extending section 23 and a front laterally extending section 24. As shown in FIG. 2, the top cross-sectional configuration of the hood member 13 possesses a trapezoidal shape, although other configurations may be employed in connection with the invention.

Each of the air inlets 16, 17, and 18 is fitted with perforated plates 25, 26, and 27 that overlap the underside of the hood member 13 and are attached by welding or the like into a position covering the respective inlets. The size and number of the perforations formed in the plates 25, 26, and 27 are of a magnitude sufficient to create a suitable ingress for ambient air to be introduced into the engine compartment 2.

An airflow controlling duct assembly 30 is affixed to the underside of the hood assembly 10 in a manner to be described. The duct assembly 10 is a welded structure having a downwardly sloped lower wall 31 disposed above a portion of the engine 4, and is of a length less than the length of the hood assembly 10 as best shown in FIGS. 3 and 5. The lower wall 31 is mounted at each of its lateral edge portions 32 and 33 by welding or the like to duct side walls 34 having a modified Z-shaped configuration as shown in FIGS. 4 and 5. Each of the duct side walls 34 includes an inward turned flange 35, on which the duct lower wall 31 is attached. The side walls of the duct assembly are defined by the substantially upright intermediate portions 35, having outwardly projecting upper flanges 37. The upper flanges 37 extend outward to a position to couple the duct side walls 34 in sealed relationship with the bottom of the hood side walls 14 by any securement technique, such as welding and the like. As shown in FIGS. 3 and 5, the intermediate portions 36 of the duct side walls 34 gradually increase in height to correspond to the downward sloped orientation of duct lower wall 31. A back plate 39 is attached to the under side of the hood member 13 at a position behind the air inlet 16. The back plate 39 is also welded into affixed relationship to the rear edges of the duct bottom wall 31 and duct side walls 34 to seal the end of the duct assembly 30, adjacent its rear coupling to the hood assembly 10.

The duct assembly 30 is further provided with a heat baffle assembly 40, forming a part of the air scoop, disposed beneath the duct lower wall 31, as best shown in FIGS. 3, 4 and 5. The baffle assembly 40 is retained in position on the duct bottom wall 31 by a suitable attachment technique, such as welding and the like. The baffle assembly includes a front baffle wall 41, lying in confronting relationship to the fan assembly 5 and having an upper sloped section 42 and bottom substantially vertical section 43 disposed adjacent a portion of the engine 4. A pair of spaced heat baffle walls 44 are affixed to the front baffle wall 41 and extend rearward on each side of an upper portion of the engine 4.

A pair of aligned openings 50 and 51 are formed in the central connection portion 20 of the hood 13 and in the wall 31. A tubular member 52 is mounted in the openings 50 and 51, and is adapted to receive the exhaust pipe 53 of the vehicle, such as shown in FIG. 1. An additional opening 54 is provided in the rear section 23 of the hood 13, which receives the air cleaner pipe 56 illustrated in FIG. 1.

From the foregoing, it should be apparent that the duct assembly 30, including the duct bottom wall 31 and side walls 34, and the baffle assembly 40, establish an air passage 60 arranged in fluid communication with the inlets 16, 17 and 18. During operation of the vehicle, the fan assembly 5 draws ambient air through the inlets 16, 17 and 18 to create an ambient air flow through air passage 60, as represented by arrows in FIG. 3. The air flow is directed through the heat exchanger 6 to cool the engine coolant in a conventional manner.

The positioning of the duct assembly 30 above the engine 4, and around a portion of the end and sides of the engine, through baffle assembly 40, inhibits thermal contact between the heated engine and the ambient air flow. The tubular member 52 further inhibits heat transfer between the exhaust pipe and air flow. Through such an arrangement, the air flow is thermally isolated from the heat of the engine and the exhaust pipe, and the establishment of a heat transfer relationship therebetween is substantially obviated. Such thermal isolation insures that an air flow of approximate ambient temperature is directed through the radiator for greater cooling efficiency as previously discussed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hood assembly for use in an off-the-road vehicle having a liquid cooled internal combustion engine which hood assembly is particularly adapted for collecting ambient air above the engine and delivering the collected ambient air to an engine coolant heat exchanger with minimal thermal contact of the air with the engine comprising; hood means forming a portion of an engine compartment of the vehicle, said hood means having a portion positioned above the engine and a portion positioned above a space between the engine and the engine coolant heat exchanger, said hood means having inlet means to receive a flow of ambient air from above and outside the engine compartment, said inlet means extending above a portion of the engine, duct means rigidly coupled to said hood means to form an air passage therewith in the engine compartment in fluid communication with said inlet means, said duct means isolating said air passage from the engine mounted in the engine compartment to prevent substantially a heat exchange relationship between the air drawn into said air passage means and the engine, and fan means positioned between the engine and the engine coolant heat exchanger and mounted in fluid communication with said air passage to draw ambient air through said inlet means and create an air flow in said duct means to deliver ambient air to the engine coolant heat exchanger to be exhausted from the engine compartment through the engine coolant heat exchanger.

2. The hood assembly according to claim 1 wherein said duct means is disposed in surrounding relationship with only a portion of the engine.

3. The hood assembly according to claim 1 wherein said inlet means includes at least one opening in said hood means and having a perforated plate disposed therein.

4. The hood assembly according to claim 3 wherein said inlet means includes a plurality of openings each having a perforated plate disposed therein.

5. The hood assembly according to claim 1 wherein said duct means includes a lower wall positioned above the vehicle engine and a pair of spaced upright walls defining a portion of said air passage means.

6. The hood assembly according to claim 5 wherein said baffle portion includes a panel rigidly coupled to said lower wall and extending downward therefrom to be positioned between an end portion of the vehicle engine and the flow passage.

7. The hood assembly according to claim 6 wherein said baffle portion further includes a pair of spaced heat baffle members projecting from said panel adapted to substantially prevent a heat exchange relationship between the engine and the ambient air flow.

8. The hood assembly according to claim 1 wherein said hood means includes an upper panel having said inlet means formed therein and a pair of hood side walls rigidly coupled to said duct means.

9. The hood assembly according to claim 8 wherein said portion of said duct means includes a lower wall and a pair of upright duct walls integral therewith, said duct walls being coupled in sealed relationship with at least a portion of said hood side walls.

10. The hood assembly according to claim 1 further including exhaust pipe means coupled to said hood means and said duct means for receiving the exhaust pipe of the engine in substantially ioslated heat exchange relationship with the flow of ambient air through said air passage means.

* * * * *

UNITED STATES PATENT OFFICE
CERTIFICATE OF CORRECTION

PATENT NO. : 4,341,277

DATED : July 27, 1982

INVENTOR(S) : Joseph W. Adamson and Clifford W. Corr

It is certified that error appears in the above-identified patent and that said Letters Patent are hereby corrected as shown below:

Col. 3, line 62, "35" should be -- 36 --.
Col. 6, Claim 10, line 32, "ioslated" should be -- isolated --.

Signed and Sealed this

Fifth Day of October 1982

[SEAL]

Attest:

GERALD J. MOSSINGHOFF

Attesting Officer    Commissioner of Patents and Trademarks